(12) United States Patent
Karaffa (10) Patent No.: US 10,620,162 B2
(45) Date of Patent: Apr. 14, 2020

(54) ULTRASONIC INSPECTION METHODS AND SYSTEMS

(71) Applicant: General Electric Company, Schenectady, NY (US)

(72) Inventor: Bruce Falco Karaffa, State College, PA (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 218 days.

(21) Appl. No.: 15/591,738

(22) Filed: May 10, 2017

(65) Prior Publication Data

US 2018/0328896 A1     Nov. 15, 2018

(51) Int. Cl.
    *G01N 29/44*     (2006.01)
    *G01N 29/04*     (2006.01)

(52) U.S. Cl.
    CPC ....... *G01N 29/043* (2013.01); *G01N 29/4418* (2013.01); *G01N 29/4463* (2013.01); *G01N 2291/0237* (2013.01)

(58) Field of Classification Search
    CPC ........... G01N 29/4463; G01N 29/4418; G01N 29/043; G01N 2291/0237
    (Continued)

(56) References Cited

U.S. PATENT DOCUMENTS

| | | | | |
|---|---|---|---|---|
| 3,587,300 A | * | 6/1971 | Fuji et al. | G01N 29/30 73/629 |
| 5,094,108 A | * | 3/1992 | Kim | G01N 29/041 310/335 |

(Continued)

FOREIGN PATENT DOCUMENTS

| | | |
|---|---|---|
| EP | 1 228 501 B1 | 12/2005 |
| WO | 2012/074997 A1 | 6/2012 |

OTHER PUBLICATIONS

A. Benammar, R. Drai and A. Guessoum, Ultrasonic Inspection of Composite Materials using Minimum Entropy Deconvolution, Materials Science Forum, Online Pub. Date: Jan. 12, 2010, 2010 Trans Tech Publications, Switzerland.

(Continued)

*Primary Examiner* — Jacques M Saint Surin
(74) *Attorney, Agent, or Firm* — Mintz Levin Cohn Ferris Glovsky and Popeo, P.C.

(57) ABSTRACT

Methods and systems for ultrasonic inspection are presented. For instance, a thin object or an object including a thin coating may be inspected. An ultrasonic signal is transmitted to the object. The dimension of the feature of the object is about one to ten wavelengths of the ultrasonic signal. An ultrasonic signal is received from the object, and includes reflections received from a back surface of the object or coating. The ultrasonic signal is processed by auto-correlating the received ultrasonic signal. The dimension of the object is measured from the processed ultrasonic signal. In one example, the received ultrasonic signal includes reflections from the object, and correlating provides a measure of the periodicity of the reflections in determining the processed ultrasonic signal. In another example, an autocorrelation is used to provide an estimate of the ultrasonic probe response which is used to improve the signal to noise ratio of additional signals received from that probe.

10 Claims, 12 Drawing Sheets

(58) Field of Classification Search
USPC .......................................................... 73/629
See application file for complete search history.

(56) References Cited

U.S. PATENT DOCUMENTS

| | | | |
|---|---|---|---|
| 5,305,239 A | | 4/1994 | Kinra |
| 5,513,531 A | | 5/1996 | Sapia et al. |
| 5,777,230 A | | 7/1998 | Vandervalk |
| 6,092,420 A | * | 7/2000 | Kimura ................. G01N 29/043 73/599 |
| 6,948,370 B2 | * | 9/2005 | Chatellier .............. G01N 19/04 427/8 |
| 8,381,592 B2 | * | 2/2013 | Cawley ................. G01N 29/069 73/617 |
| 8,632,244 B2 | | 1/2014 | Bar-Cohen et al. |
| 8,857,262 B2 | * | 10/2014 | Turner .................... B61K 9/10 73/597 |
| 9,835,450 B2 | * | 12/2017 | Deleye .................. G01B 17/02 |
| 2015/0000405 A1 | | 1/2015 | Singh et al. |
| 2015/0106038 A1 | | 4/2015 | Turner |
| 2017/0016860 A1 | * | 1/2017 | Prause .................. G01N 29/11 |

OTHER PUBLICATIONS

International Search Report and Written Opinion issued in connection with corresponding PCT Application No. PCT/US2018/031753 dated Sep. 11, 2018.

\* cited by examiner

FIG. 6D

ULTRASONIC INSPECTION METHODS AND SYSTEMS

BACKGROUND

The subject matter disclosed herein relates to ultrasonic inspection, and more particularly to methods and systems for enhanced ultrasonic inspection, e.g., for ultrasonic inspection of thin materials or coatings on an object, or for enhancing high noise ultrasonic signals.

Ultrasonic testing devices can be used to inspect objects to detect and analyze anomalies in the objects. Such testing can involve placing one or more probes on or near the surface of the test object in order to perform testing of the underlying structure, using ultrasonic acoustic waves.

Generally, an ultrasonic testing system can include an ultrasonic probe for transmitting and receiving ultrasonic acoustic waves to and from a test object, and a probe cable for connecting the ultrasonic probe to an ultrasonic test unit that includes a processor for processing signals and calculating measurements and a display for viewing the test results. In an ultrasonic testing system, electrical pulses are fed from the ultrasonic test unit to an ultrasonic probe where they are transformed into acoustic pulses by one or more ultrasonic transducers (e.g., piezoelectric elements) in the ultrasonic probe. During operation, electrical pulses are applied to the electrodes of one or more ultrasonic transducers, thus generating ultrasonic acoustic waves that are transmitted to the test object to which the probe is coupled either directly on the surface of the test object or, e.g., through water in which the test object is immersed. Conversely, when an ultrasonic acoustic wave is reflected from the test object and contacts the surface of the ultrasonic transducer(s), it causes the transducer(s) to vibrate, generating a voltage that is detected as a receive signal by the ultrasonic test unit. As the ultrasonic acoustic waves pass through the test object, various reflections, or echoes, can occur as the ultrasonic acoustic waves interact with anomalies within the test object.

When inspecting an object comprising a thin material, problems may occur due to multiple echoes received from the back wall of the thin material. In such a case, if the material has a dimension that is near the wavelength of the ultrasonic signal, e.g., within ten wavelengths, the multiple received echo reflections may obscure the received signal in such a way as to prevent measurement. In addition, noisy signals may be collected, which defy conventional analysis techniques. Therefore, a need exists for enhanced ultrasonic inspection techniques.

SUMMARY

Methods and systems for ultrasonic inspection are presented. For instance, a method for inspection of an object with a transmitted ultrasonic signal is disclosed. The dimension of a feature of the object can be about one to ten wavelengths of the ultrasonic signal. An ultrasonic signal is received from the object. The received ultrasonic signal is correlated with a correlation signal to determine a processed ultrasonic signal. The feature of the object is measured from the processed ultrasonic signal.

In another aspect, a method for inspection of an object is disclosed. An ultrasonic signal is transmitted to the object. The dimension of the object is about one to ten wavelengths of the ultrasonic signal. An ultrasonic signal is received from the object. The received ultrasonic signal includes reflections received from at least one surface of the thin object. The ultrasonic signal is processed by auto-correlating the received ultrasonic signal. The dimension of the object is measured from the processed ultrasonic signal.

In a further aspect, a system for inspection of an object is disclosed. The system includes an ultrasonic transmitter for transmitting a transmitted ultrasonic signal to the object, an ultrasonic receiver for receiving a received ultrasonic signal from the object and a processor. The received ultrasonic signal is correlated, by the processor, with a correlation signal to determine a processed ultrasonic signal. The feature of the object is measured, by the processor, from the processed ultrasonic signal.

An advantage that may be realized in the practice of some disclosed embodiments of the method or system is that objects that are near in size to the wavelengths of the highest frequency ultrasound systems may be inspected to determine thickness.

A second advantage that may be realized in the practice of some disclosed embodiments of the method or system is that ultrasonic signals with a low signal to noise ratio may be more accurately processed.

The above embodiments are exemplary only. Other embodiments are within the scope of the disclosed subject matter.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the disclosed subject matter encompasses other embodiments as well. The drawings are not necessarily to scale, emphasis generally being placed upon illustrating the features of certain embodiments of the invention. In the drawings, like numerals are used to indicate like parts throughout the various views.

DETAILED DESCRIPTION

Embodiments of the disclosed subject matter provide for ultrasonic inspection, for example, ultrasonic inspection of thin material or other features in which the features are only slightly larger than the wavelength used in the inspection, e.g., between about 1 and about 10 wavelengths, or more specifically around 4 wavelengths. Other embodiments are within the scope of the disclosed subject matter. For instance, the methods and systems disclosed herein may be used for enhancing the performance of ultrasonic inspection systems by allowing relatively lower frequency systems to be used to inspect relatively thin os. As such, the techniques improve the technical field of ultrasonic inspection by allowing, for instance, smaller, more portable gear to be used to inspect small features and defects. In addition, the techniques may solve the technical problem of extending the range of ultrasonic inspection to near-wavelength domains.

Figure 1A:
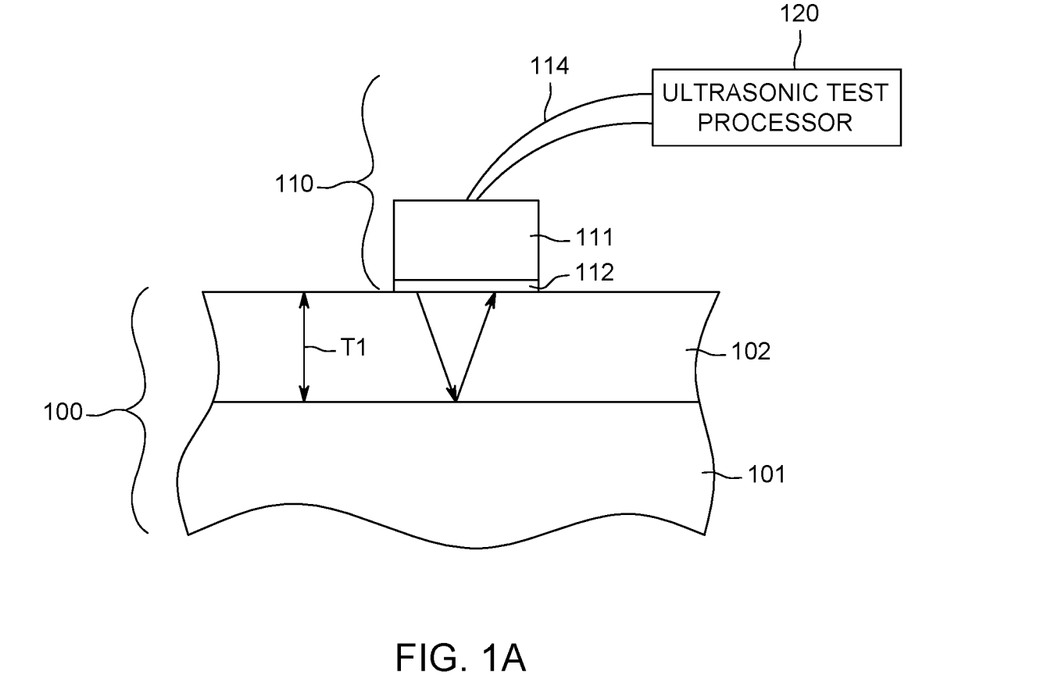
FIG. 1A depicts a system for ultrasonic inspection of an object.

FIG. 1A depicts a system 110 for ultrasonic inspection of an object 100. In the embodiment depicted in FIG. 1A, the object 100 includes a feature 102 above a substrate 101. For example, the object 100 may be a segment of a gas pipeline shown in cross-section, with the feature 102 being the main body of the pipeline having a thickness $T_1$, and the substrate 101 being a fluid carried by the pipeline. The system 110 can include an ultrasonic transducer 111 coupled to the object 100 through a coupler 112. While performing ultrasonic inspection, the ultrasonic transducer 111 can transfer signals via a probe cable 114 to an ultrasonic test processor 120.

The system 110 can transmit and receive signals representing acoustic waves to and from the object 110, and the probe cable 114 for connecting the ultrasonic probe to the ultrasonic test processor 120 that includes a computing processor or controller, memory, and affiliated circuitry (e.g., as described below) for processing signals and calculating measurements in accordance with the techniques set forth herein. A display for viewing the test results is also provided.

Figure 1B:
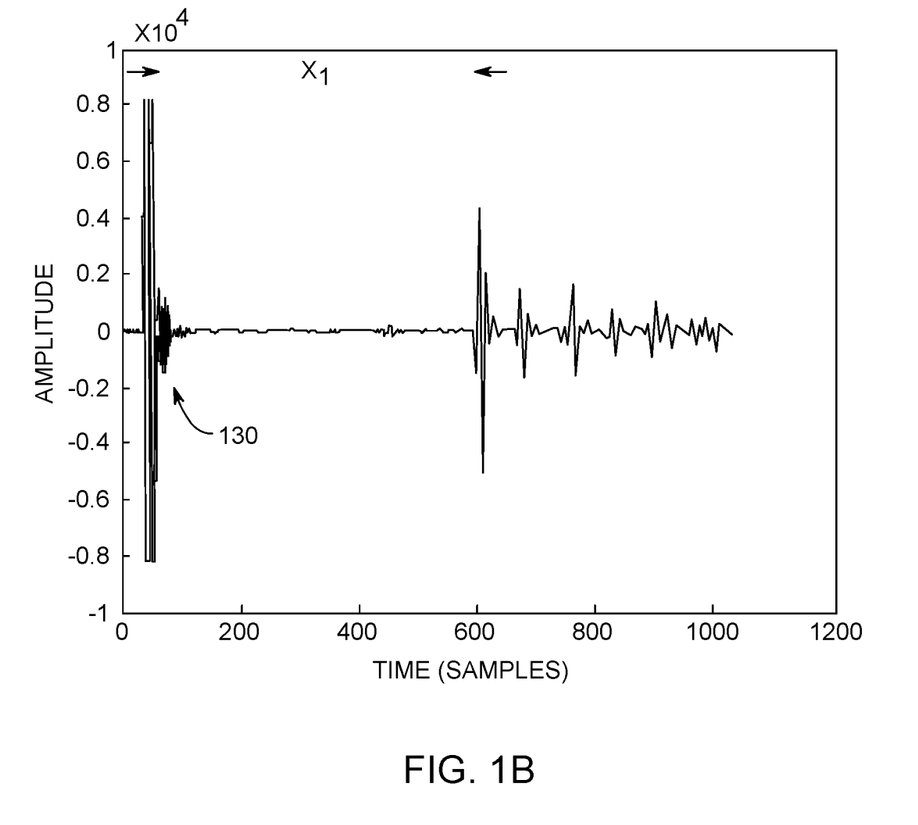
FIG. 1B depicts an ultrasonic signal received from an object.

FIG. 1B is an exemplary graph of an ultrasonic signal received from the object 100 of FIG. 1A. The graph of FIG. 1B displays an amplitude in volts on the y-axis and a time, measured in sample number, on the x-axis. The instrument may be set so that a sufficient number of samples may be received to see the echo(es) from the back wall.

By way of explanation, material thickness may be measured using the system 110 by measuring the time required for an acoustic pulse generated by the ultrasonic transducer 111 to pass through the feature 102, reflect off of the back of the material, i.e., the back wall at the interface between the feature 102 and the substrate 101, and be received by the ultrasonic transducer 111. For a material which is relatively thick, this method can provide a simple, accurate method of measurement.

The example of FIG. 1B depicts the results of inspecting a 0.3 inch steel specimen using the system 110. The excitation pulse 130, can plainly be seen on the left hand side of the graph of FIG. 1B. A distinct series of echoes may be seen to the right of the excitation pulse 130. Measuring the number of samples yields a measurement of the time $X_1$ between the main bang and the first returned echo. The acoustic velocity of the material may be used to calculate the thickness of the feature 102. In this example, the samples are produced at a frequency of 62.5 megahertz (MHz), meaning that each sample represents a 16 nanosecond (nS) period. The number of samples from the beginning of the excitation pulse to the reception of the back wall echo is counted. This is a measurement of the total time from the beginning of the excitation pulse to the reception of the echo. This time includes both the delay inherent to the ultrasonic probe and the time required for the acoustic wave to travel through the material. The probe delay is measured during a calibration step and subtracted from the total measured time. The difference is the time required for the acoustic wave to travel from the probe, to the back wall, then back to the probe. Dividing this time by the acoustic velocity of the material gives the distance of the two-way sound path.

Figure 2:
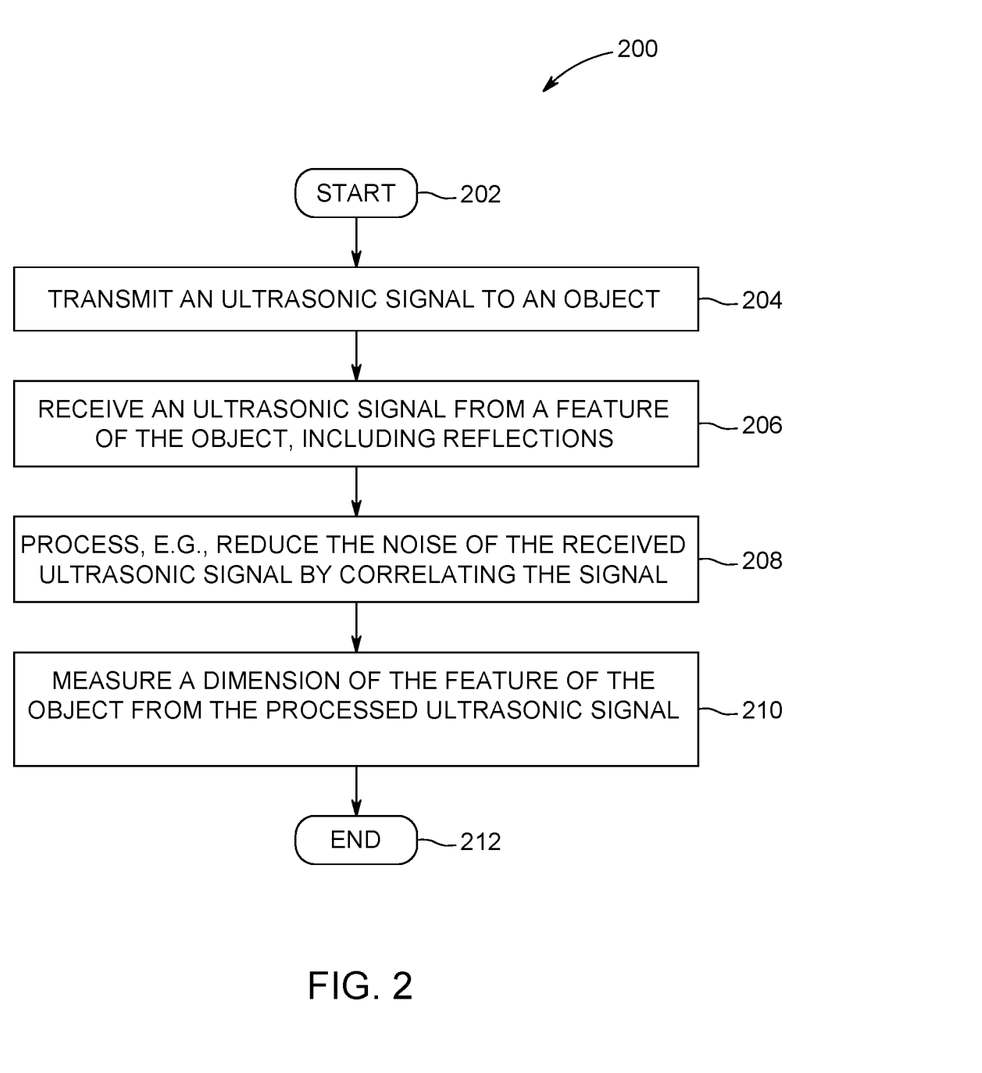
FIG. 2 is a flow diagram of an example method for ultrasonic inspection.

FIG. 2 is a flow diagram of an example method 200 for ultrasonic inspection. In one embodiment, the method 200 at block 202 starts, e.g., on the processor 120 of FIG. 1A, when a user of an ultrasonic inspection system, e.g., the system 110 (FIG. 1A) initiates inspection of an object, e.g., an object 300 of FIG. 3. The method 200 at block 204 transmits an ultrasonic signal to the object. In such a case, the ultrasonic signal may have a wavelength larger than a dimension of the object.

In one example, a relatively high frequency ultrasonic system may be used to inspect a relatively thin object that is too small to inspect given conventional techniques due to the object having dimensions too close to the wavelength used. In another example, a less expensive, ultrasonic system may be used at a lower inspection frequency, and therefore at a correspondingly larger wavelength.

In either case, the technique can allow for the processing of signals to inspect features, such as objects that have dimensions that are near than the wavelength used for inspection. Thus, in some embodiments, the techniques may be extended beyond that of conventional systems, and in other embodiments, the techniques may extend the abilities of lower frequency ultrasonic systems beyond their current capabilities.

In one example, the method 200 at block 204 may transmit an ultrasonic signal from a single transducer. In another example, the method 200 at block 204 may transmit an ultrasonic phased array signal from multiple transducers. For example, the transmitted ultrasonic signal may have a wavelength larger than a feature of the object under inspection.

Continuing, the method 200 at block 206 receives an ultrasonic signal from the object. In one example, the method 200 at block 206 receives echoes or reflections from the object. In such a case, the echoes or reflections may be generated by internal features of the object, such as front walls and back walls of one or more strata present in the objects. The echoes or reflections may originate with some or all of the features. For example, echoes may be present from both the front wall and the back wall of a thin object being inspected.

Next, the method 200 at block 208 processes the received ultrasonic signal. For example, the method 200 at block 208 may correlate the received ultrasonic signal with a correlation signal. For example, auto-correlating of the received ultrasonic signal may be performed to determine the processed ultrasonic signal.

In one example, the method 200 at block 208 may process the signal using an equation of the form:

$$R_{yy}(m) = \Sigma_{n=0}^{N-m-1} y(n)y(n-m), \text{ where}$$

$R_{yy}(m)$ is the processed ultrasonic signal,
y(n) is the received ultrasonic signal, and
N is the number of samples in the received ultrasonic signal.

In another example, the method 200 at block 208 may use an equation of the form:

$$R_{xy}(m) = \Sigma_{n=0}^{N-m-1} x(n)y(n-m), \text{ where}$$

$R_{xy}(m)$ is the processed ultrasonic signal,
x(n) is a correlation signal, and
y(n) is the received ultrasonic signal, and
N is the number of samples in the received ultrasonic signal.

For example, x(n) may be the probe response of the ultrasonic transducer, as explained below with respect to FIGS. 6A-6C.

In a further example, the method 200 at block 206 may receive reflections from the feature of the object, and the method 200 at block 208 may reduce at least some of the noise in the processed ultrasonic signal, e.g., by the use of signal processing such as autocorrelation to determine the probe response, then correlation with the probe response.

Next, the method 200 at block 210 may measure the feature of the object from the processed ultrasonic signal. In one example, the processed signal displays distinct peaks which may be measured to determine the number of samples, and hence the travel time, of the acoustic signal.

Figure 3:
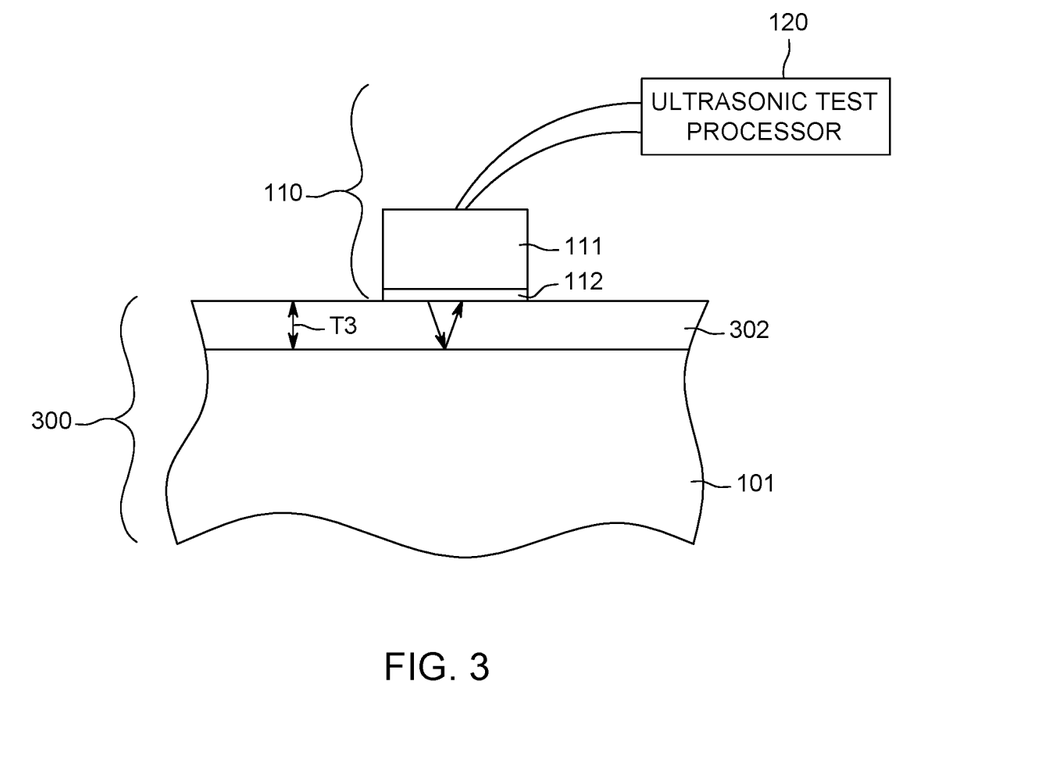
FIG. 3 depicts a system for ultrasonic inspection of an object.

Specific examples of the ultrasonic inspection techniques are set forth with respect to FIGS. 3-6C. In particular, FIG. 3 depicts a system 100, for ultrasonic inspection of an object 300. In the example of FIG. 3, by contrast with FIG. 1, the object 300 includes a thinner coating 302 that has a thickness $T_3$, which is smaller than $T_1$.

Figure 4A:
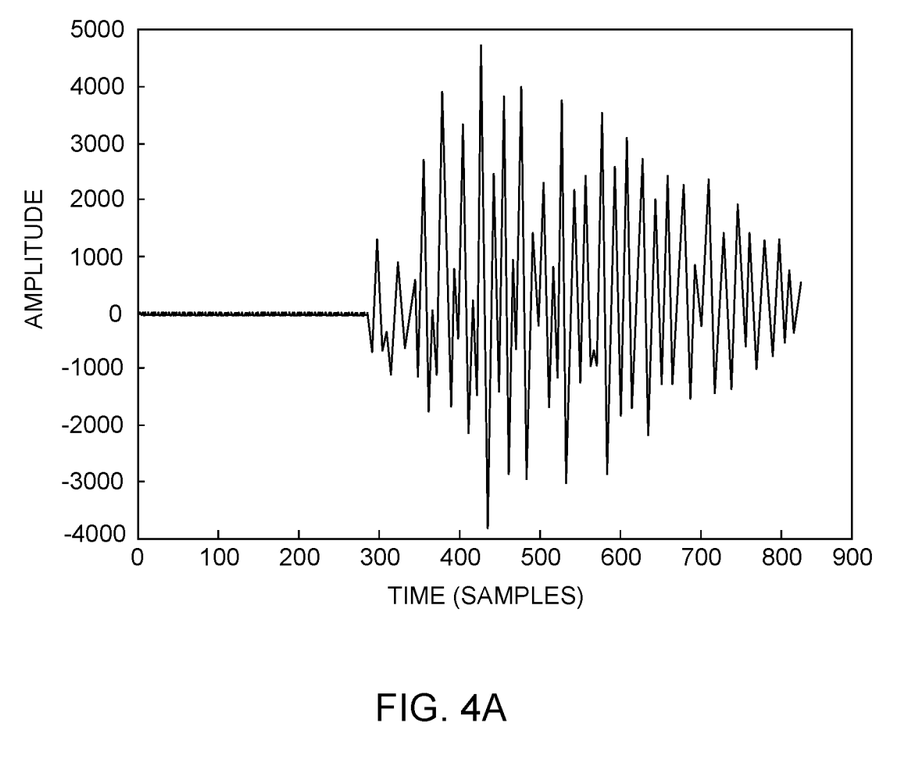
FIG. 4A depicts an ultrasonic signal received from an object.
Figure 4B:
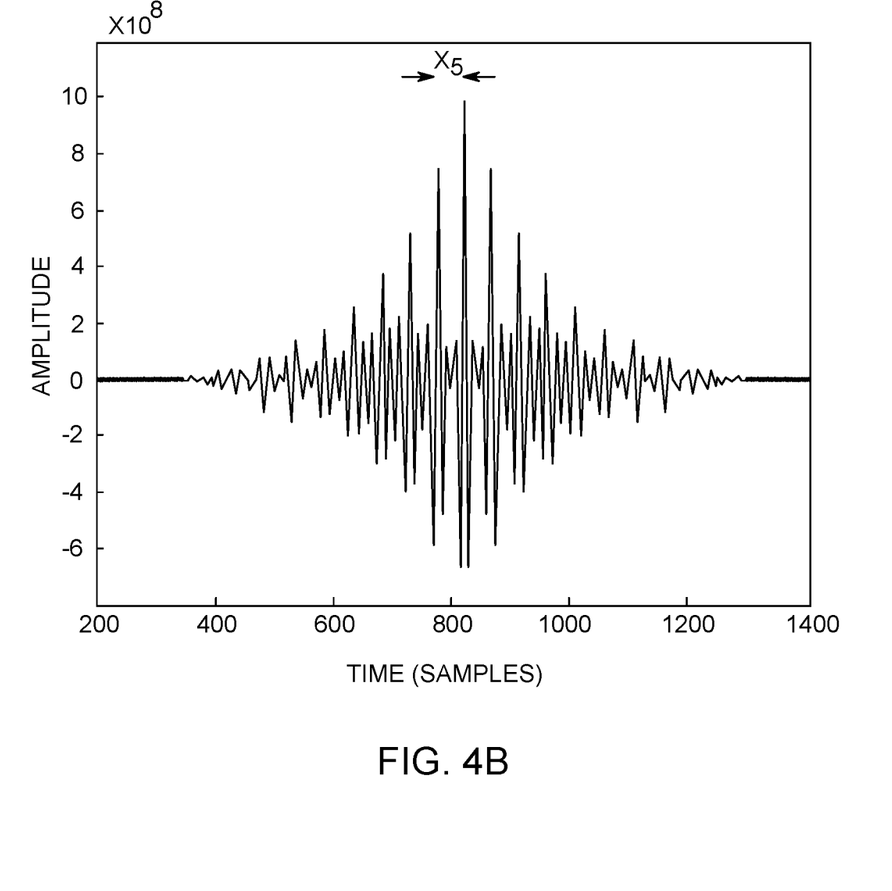
FIG. 4B depicts a processed ultrasonic signal.

For instance, a working example is set forth with respect to FIGS. 4A and 4B. FIG. 4A depicts an ultrasonic signal received from an object having a 0.1 inch steel test block. The ultrasonic transducer is set to a pulser voltage of 100 V. The probe frequency is 5 MHz. Multiple echoes between the front wall and the back wall of the object set up a standing wave that can make interpretation of the received signal difficult.

FIG. 4B depicts the processed ultrasonic signal of FIG. 4A, using an autocorrelation equation of the form:

$$R_{yy}(m) = \Sigma_{n=0}^{N-m-1} y(n)y(n-m), \text{ where}$$

$R_{yy}(m)$ is the processed ultrasonic signal,
y(n) is the received ultrasonic signal, and
N is the number of samples in the received ultrasonic signal.

As depicted in FIG. 4B, the autocorrelation yields a distinct series of peaks, allowing measurement of the time (e.g., number of samples) between peaks. For instance, the distance between peaks is 52 (16 nS) samples, representing a two-way time (i.e., through the sample and back). Using a value of 233000 in/sec as the acoustic velocity of steel, we can calculate that 0.1 inch of steel should have an acoustic one-way time of about 0.43 uS, or 26.8 samples, thus validating the example of FIGS. 4A-4B.

Figure 5A:
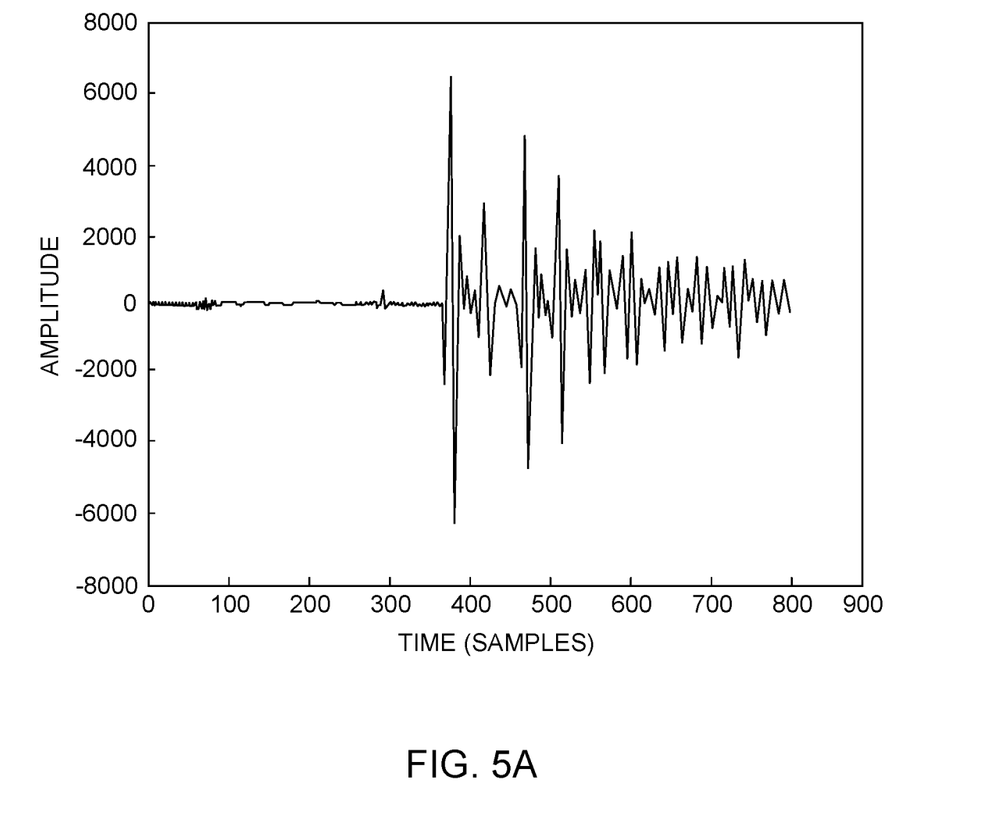
FIG. 5A depicts an ultrasonic signal received from an object.
Figure 5B:
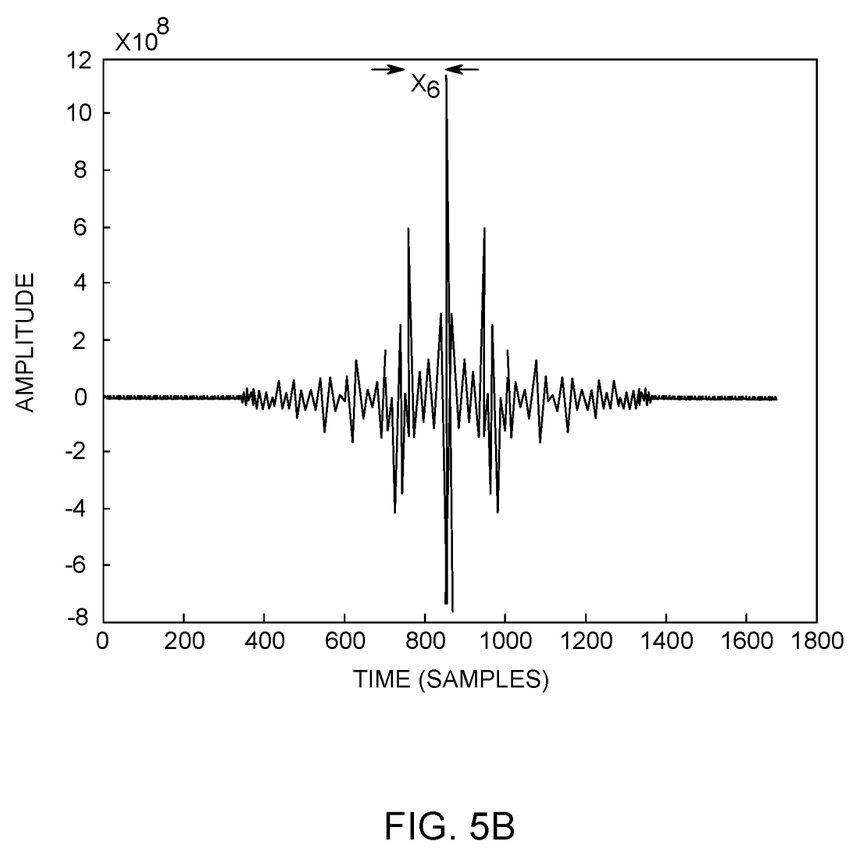
FIG. 5B depicts a processed ultrasonic signal.

Another working example is set forth with respect to FIGS. 5A-5C, again with a probe frequency of 5 MHz. FIG. 5A depicts an ultrasonic signal received from an object having a 0.2 inch steel test block. Since the back wall echoes do not overlap on this collection, it is possible to directly measure the time between peaks as 102 (16 nS) samples, or roughly twice what we measured from the autocorrelation of the 0.1 inch signal. The autocorrelation of the signal of FIG. 5A is shown in FIG. 5B. In this case, 103 samples were measured between peaks, or double the number of samples between peaks of the 0.1 inch test block collection.

Figure 6A:
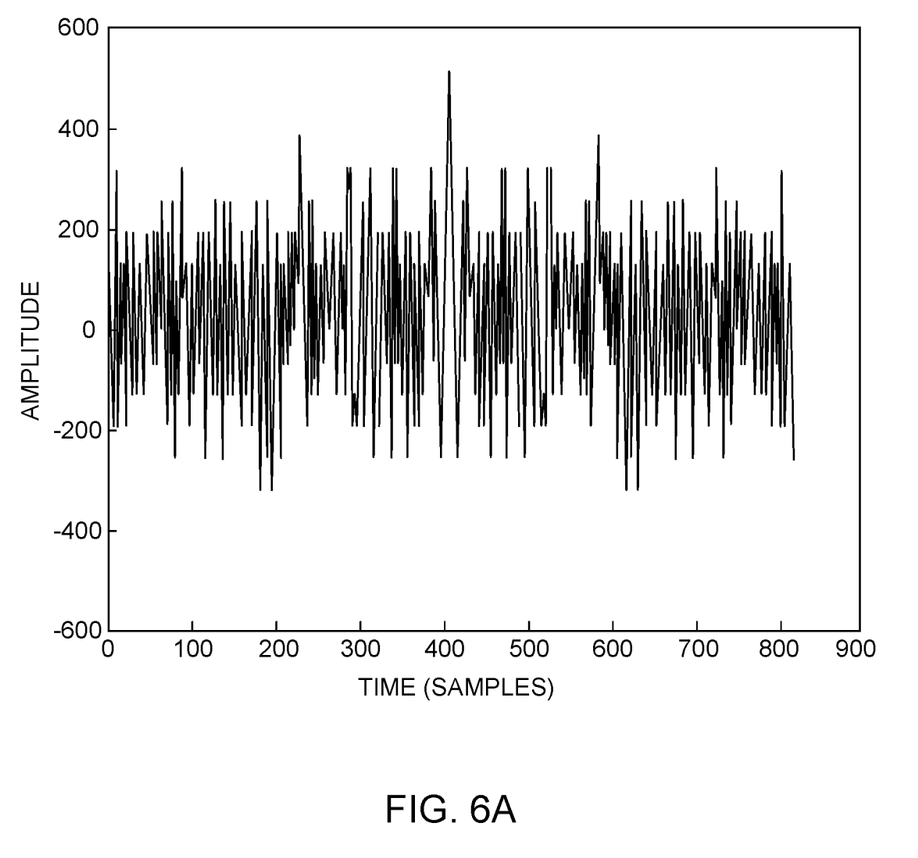
FIG. 6A depicts a low signal-to-noise ratio (SNR) ultrasonic signal received from an object.
Figure 6B:
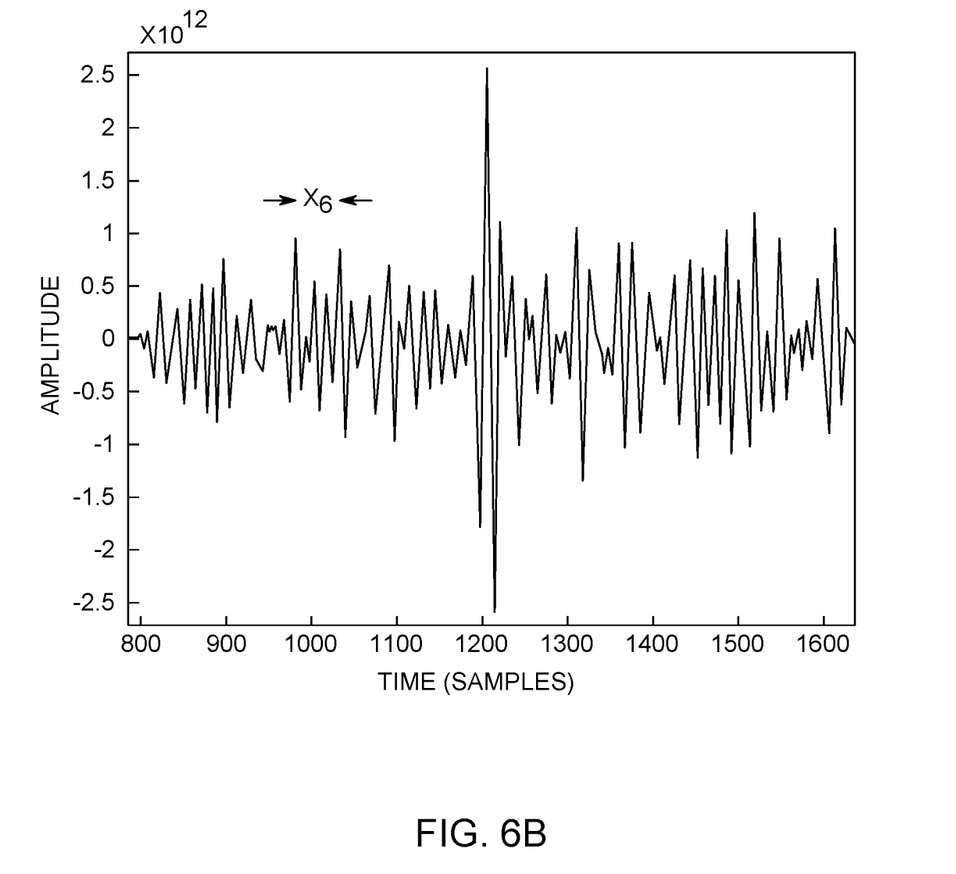
FIG. 6B depicts the signal of FIG. 6A after correlating with a probe response signal.
Figure 6C:
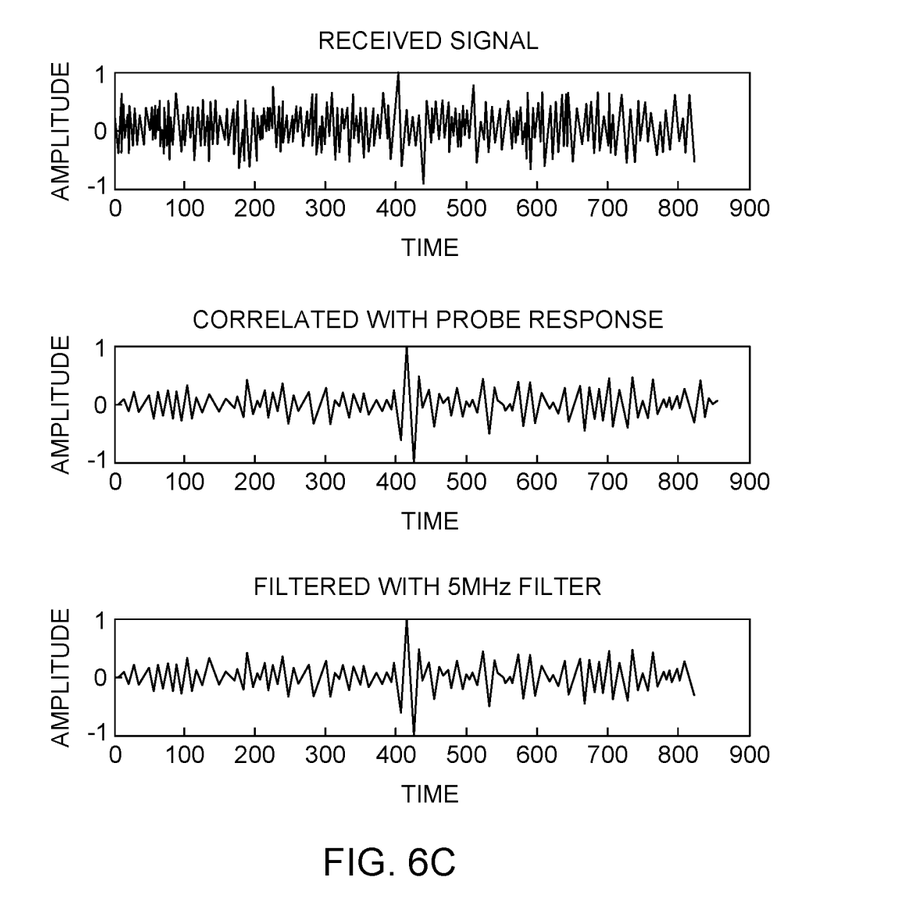
FIG. 6C depicts the signal of FIG. 6A after correlating with a probe response signal, compared to the signal of FIG. 6A after applying a digital filter.

A further working example is set forth with respect to FIGS. 6A-6C, in which the received ultrasonic signal is noisy due to, for example, poor conditions during data collection. As such, FIG. 6A depicts a low signal-to-noise ratio (SNR) ultrasonic signal received from a 0.3 inch test block. As in the previous examples, the probe frequency is 5 MHz.

In this example, the ultrasonic signal of FIG. 4B, which is an autocorrelation of the signal of FIG. 4A, may be used to estimate a probe response function that provides the response of the probe in a generalized manner. As may be seen, the center peak of the function resembles the sync function, and may be indicative of the ultrasonic transducer probe's frequency response. An expanded view of the center portion of the signal of FIG. 4B is provided in FIG. 6D. As such, the signal of FIG. 6D may be used to extract signal from noise in a low SNR collection of FIG. 6A.

Figure 6D:
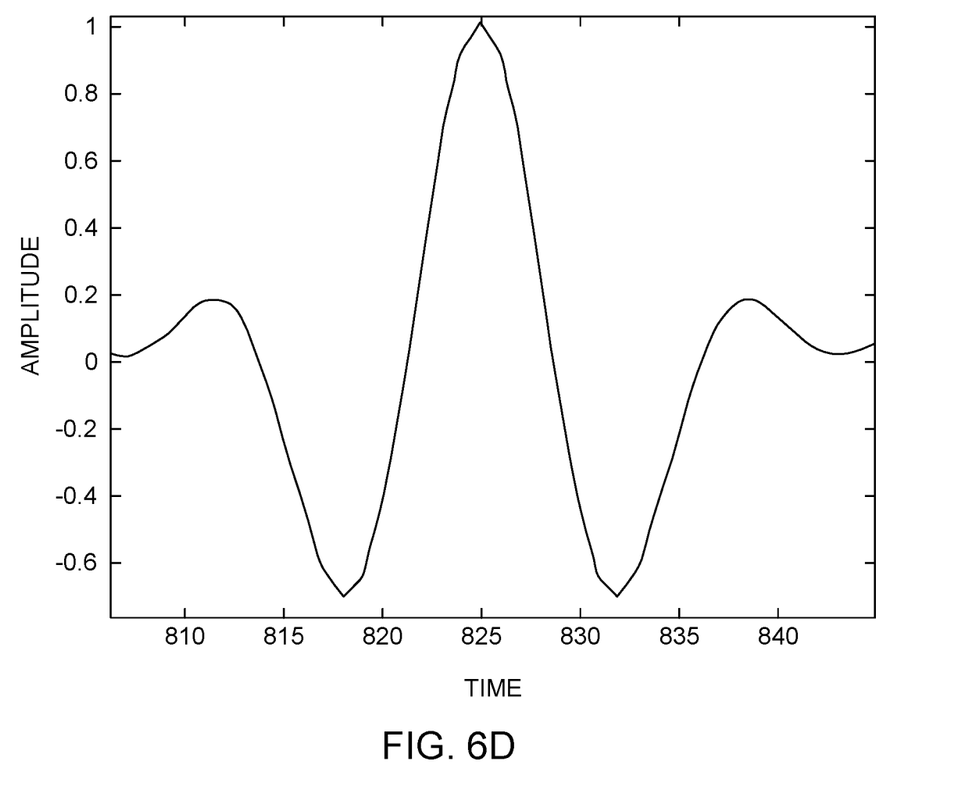
FIG. 6D depicts an expanded view of the center portion of the signal of FIG. 4B.

FIG. 6B depicts the signal of FIG. 6A after correlating with the signal of FIG. 6D, using an equation of the form:

$$R_{xy}(m) = \Sigma_{n=0}^{N-m-1} x(n)y(n-m), \text{ where}$$

$R_{xy}(m)$ is the processed ultrasonic signal,
x(n) is a correlation signal, e.g., the signal of FIG. 6D, and
y(n) is the received ultrasonic signal, e.g., the signal of FIG. 6A, and
N is the number of samples in the received ultrasonic signal.

As seen in FIG. 6B, the noise has been reduced, allowing a time of flight of $X_6$ to be readily determined, and used to measure the thickness of the object, despite the noisy signal.

It can be shown that correlation by a sync function is equivalent to filtering with a filter whose coefficients are elements of that sync function. Thus the technique described above may be used to generate a matched filter for use in the technique.

In order to compare the technique, FIG. 6C depicts a side-by-side comparison of the received ultrasonic signal, the signal correlated with a probe response, and the signal filtered with a digital 5 MHz filter similar to a filter that may be found in a standard ultrasonic inspection instrument. The technique described above shows more than a 3 dB improvement in Signal to Noise Ratio (SNR).

Thus, autocorrelation of a signal containing multiple overlapping back wall reflections or echoes has potential to make thickness measurements possible where conventional methods fail, for instance, due to the thickness being small relative to the wavelength.

Although the techniques set forth herein have been described with respect to specific usages, the method may be used in any situation in which ultrasonic signals may need to be analyzed. Thus, the specific example embodiments are meant only to explain the technique, not limit the technique. In some embodiments, the method steps may be performed in the order presented in FIG. 2 and/or as described herein. In other embodiments, one or more of the steps may be omitted, additional steps may be added, or the steps may be performed in a different order.

In view of the foregoing, embodiments of inspection methods and systems may use correlation in the processing of received ultrasonic signals. A technical effect may be that relatively thin objects and features may be inspected, as compared to other embodiments. This can allow for the use of less expensive ultrasonic inspection systems or the improved resolution when inspecting objects. For example, by determining the probe response of an ultrasonic inspection probe using auto-correlation, signal to noise ratio may be reduced, allowing ultrasonic inspection to proceed even in relatively noisy environments, such as oil and gas pipelines, other industrial applications, or elsewhere.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for inspection of an object, the object having a feature with a dimension, the method comprising:

transmitting, by an ultrasonic probe, an ultrasonic signal to an object, wherein the dimension of the feature of the object is about one to ten wavelengths of the ultrasonic signal;

receiving, by the ultrasonic probe, an ultrasonic signal from the object;

auto-correlating the received ultrasonic signal to determine a processed ultrasonic signal including a distinct series of peaks; and measuring a time between respective ones of the series of peaks; and determining the dimension of the feature of the object from the measured time and the velocity of sound of the object.

2. The method of claim 1, wherein the correlating comprises an equation of the form $$R_{yy}(m) = \Sigma_{n=0}^{N-m-1} y(n)y(n-m), \text{ wherein}$$

$R_{yy}(m)$ is the processed ultrasonic signal,
   $y(n)$ is the received ultrasonic signal, and
   N is the number of samples in the received ultrasonic signal.

3. A method for inspection of an object with an ultrasonic probe, the system comprising:

transmitting, by an ultrasonic probe, a first ultrasonic signal to an object including a feature having a dimension;

receiving a first ultrasonic signal from the object, the received ultrasonic signal comprising reflections received from the object;

processing the first received ultrasonic signal by auto-correlating the first received ultrasonic signal;

using the auto-correlated signal to estimate a probe response function of the ultrasonic probe;

correlating the estimated probe response with a second received ultrasonic signal from a second transmitted ultrasonic signal transmitted by the ultrasonic probe to provide an improved ultrasonic signal; and determining the dimension of the feature from the processed ultrasonic signal.

4. The method of claim 1, wherein the dimension of the dimension of the feature of the object is between one and four times the wavelength of the ultrasonic signal.

5. The method of claim 1, wherein the feature of the object comprises a thin coating and the dimension of the feature of the object is about the wavelength of the transmitted ultrasonic signal.

6. A system for inspection of an object, the system comprising:

an ultrasonic transmitter for transmitting a transmitted ultrasonic signal to an object having a feature with a dimension;

an ultrasonic receiver for receiving a received ultrasonic signal from the object; and a processor for
auto-correlating the received ultrasonic signal to determine a processed ultrasonic signal including a series of distinct peaks,
measuring a time between respective ones of the series of peaks; and
determining the dimension of feature of the object from the measured time and the velocity of sound of the object;

wherein the auto-correlation comprises an equation of the form $$R_{yy}(m) = \Sigma_{n=0}^{N-m-1} y(n)y(n-m),$$ wherein $R_{yy}(m)$ is the processed ultrasonic signal,
y(n) is the received ultrasonic signal, and
N is the number of samples in the received ultrasonic signal.

7. The system of claim 6, wherein the feature of the object comprises a thin coating comprising a front surface and a back surface, and the received ultrasonic signal comprises reflections received from the back surface of the thin coating.

8. The system of claim 7, wherein the received ultrasonic signal comprises reflections received from the back surface of the thin coating.

9. The method of claim 3, wherein correlating the estimated probe response of the ultrasonic signal with the second received ultrasonic signal comprises an equation of the form:

$$R_{xz}(m) = \Sigma_{n=0}^{N-m-1} x(n)z(n-m),$$ wherein $R_{xz}(m)$ is the improved ultrasonic signal,
x(n) is the second received ultrasonic signal,
z(n−m) is the probe response function, and
N is the number of samples in the second received ultrasonic signal.

10. The method of claim 3, further comprising generating coefficients for a matched filter from the estimated probe response.

* * * * *